Figure 1:
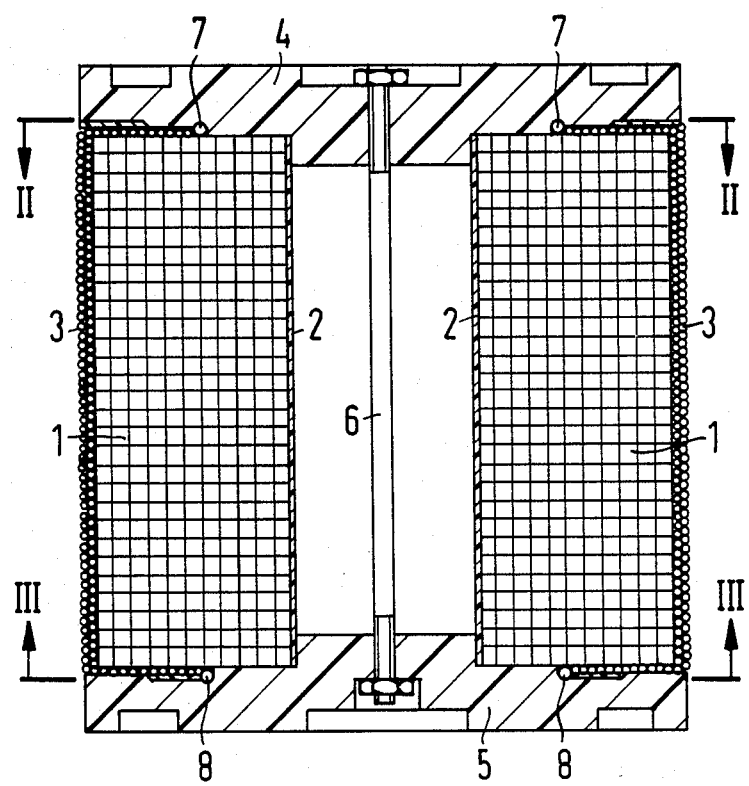

United States Patent [19]

Krös et al.

[11] Patent Number: 4,495,542
[45] Date of Patent: Jan. 22, 1985

[54] ELECTRIC ROLLER-TYPE CAPACITOR AND METHOD AND DEVICE FOR PRODUCING THE CAPACITOR

[75] Inventors: Rudolf Krös, Heidenheim; Harald Vetter, Regensburg, both of Fed. Rep. of Germany

[73] Assignee: Siemens Aktiengesellschaft, Berlin and Munich, Fed. Rep. of Germany

[21] Appl. No.: 545,063

[22] Filed: Oct. 25, 1983

[30] Foreign Application Priority Data

Oct. 27, 1982 [DE] Fed. Rep. of Germany ....... 3239865

[51] Int. Cl.³ .................... H01G 4/00; H01H 85/30
[52] U.S. Cl. .................................... 361/301; 336/206
[58] Field of Search ............. 361/271, 301; 29/25.42; 336/206, 207; 156/166

[56] References Cited

U.S. PATENT DOCUMENTS

| | | | |
|---|---|---|---|
| 1,485,289 | 2/1924 | Peterson | 336/206 X |
| 3,297,970 | 1/1967 | Jones | 336/206 X |
| 4,298,653 | 11/1981 | Maaghul | 156/166 X |
| 4,344,808 | 8/1982 | Healey et al. | 156/166 |

Primary Examiner—Donald A. Griffin
Attorney, Agent, or Firm—Herbert L. Lerner; Laurence A. Greenberg

[57] ABSTRACT

An electric roller-type capacitor formed with a capacitor winding built into a housing and having end-face contact layers, includes a wrapping consolidating the capacitor winding, the wrapper being formed of a fiberglass-reinforced synthetic resin composite, and method and device for producing the capacitor.

3 Claims, 3 Drawing Figures

ELECTRIC ROLLER-TYPE CAPACITOR AND METHOD AND DEVICE FOR PRODUCING THE CAPACITOR

The invention relates to an electric roller-type capacitor, such as a power capacitor, especially, which is built into a housing and is provided with end-face contact layers, and to a method and a device for producing the capacitor.

Such capacitors are known where the windings thereof are consolidated with very strong tapes or wrappings to prevent the capacitor housings from bursting.

In the case of defective capacitors, the wrappings must be able to convert the energy content of the windings into mechanical deformation energy to an extent that the capacitor housings can be deformed only within permissible limits. With impregnated capacitors, the material-dependent oil influence must simultaneously not exceed harmful values.

In large capacitor windings, dummy end turns of paper and/or foils of plastic material with different numbers of layers have been used heretofore as wrappings. All such wrappings have in common that they are executed as wound foils in the outer region of the winding, without simultaneously providing insulation at the end face and a reinforcement or consolidation of the winding. When several windings are used in one capacitor housing, assurance must be provided that no short circuit can occur between different capacitor windings through the end-face contact surfaces thereof.

It is an object of the invention to provide such an electric roller-type capacitor with a wrapping so that a cost-effective reinforcement or consolidation of the winding occurs also at the end faces, and the insulation at the end faces and the mechanical centering of the windings are ensured radially as well as axially (i.e. the ability to stack the windings), and to provide a method for manufacturing such a capacitor and a device for performing the method.

With the foregoing and other objects in view, there is provided, in accordance with the invention, an electric roller-type capacitor, formed with a capacitor winding built into a housing and having end-face contact layers, which comprises a wrapping consolidating the capacitor winding, the wrapping being formed of a fiberglass-reinforced synthetic resin composite.

In accordance with another feature of the invention, the wrapping covers the circumference of the winding as well as parts of the end-face contact layers.

In accordance with a further feature of the invention, the fiberglass reinforced synthetic resin compound is formed with a toothing in vicinity of the end faces of the capacitor winding.

In accordance with another aspect of the invention, there is provided a method for producing an electric roller-type capacitor formed with a capacitor winding built into a housing and having end-face contact layers, which comprises wrapping a fiberglass thread, after it has passed through a resin impregnation bath, around the capacitor winding in a coil-like manner, and subsequently hardening the fiberglass-reinforced synthetic resin composite.

In accordance with another mode of the invention, the method includes degassing the synthetic resin composite in a vessel under reduced pressure prior to hardening the resin.

In accordance with a concomitant aspect of the invention, there is provided a device for performing a method of producing an electric roller-type capacitor formed with a capacitor winding built into a housing and having end-face contact layers, comprising two form halves insertable into a tubular core of a capacitor winding and held together by a clamping device, the form halves having different shapes forming a toothing in a wrapping of fiberglass-reinforced synthetic resin composite on a common pitch circle therebetween; and a respective sealing element radially sealing the two form halves against parts of the end-face contact layers remaining free.

Other features which are considered as characteristic for the invention are set forth in the appended claims.

Although the invention is illustrated and described herein as embodied in an electric roller-type capacitor and method and device for producing the capacitor, it is nevertheless not intended to be limited to the details shown, since various modifications and structural changes may be made therein without departing from the spirit of the invention and within the scope and range of equivalents of the claims.

Figure 2:
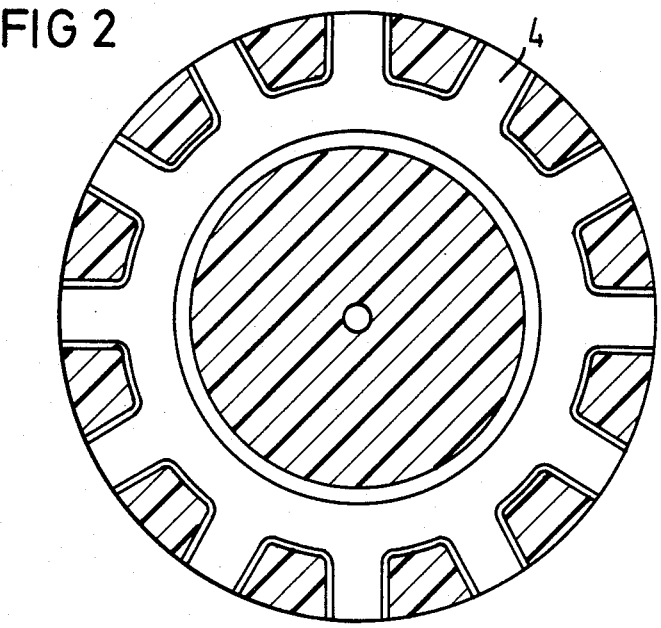
Figure 3:
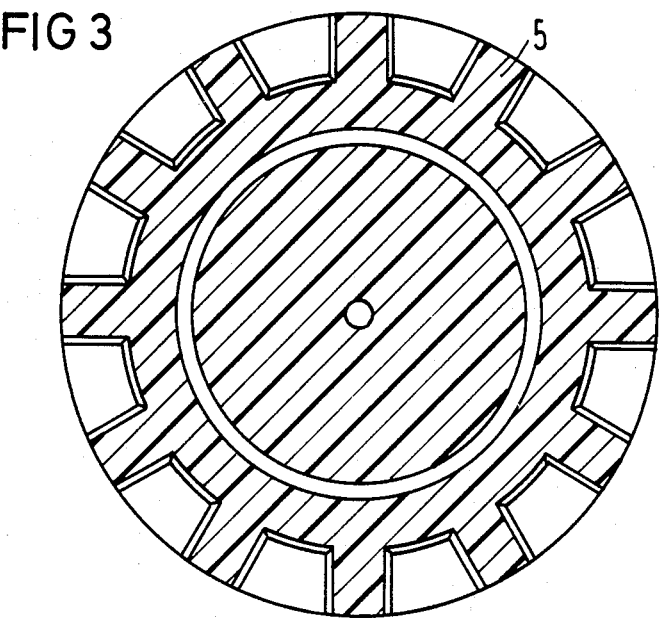

The construction and method of operation of the invention, however, together with additional objects and advantages thereof will be best understood from the following description of specific embodiments when read in connection with the accompanying drawings, in which:

FIG. 1 is a cross-sectional view of a capacitor with a device for producing the capacitor applied thereto; and FIGS. 2 and 3 are respective cross-sectional views of the device taken along the lines II—II and III—III in FIG. 1.

Referring now to the drawings and first, particularly to FIG. 1 thereof, there is shown a capacitor winding 1 which is wound on a tubular core 2. On the outside thereof, the capacitor winding 1 is provided with a wrapping formed of a fiberglass thread 3 which is wrapped or wound around the winding in a coil-like manner, it having been passed through a resin impregnation bath, for example, with an epoxy resin, before being wound. The wrapping with the synthetic-resin-impregnated fiberglass thread 3 is located not only on the outer cylindrical side but also, in part, at the end faces of the capacitor winding 1.

To produce the fiberglass wrapping, a device is provided having two halves 4 and 5 which are inserted into the tubular core 2 of the capacitor winding 1 and are connected to one another by means of a clamping device 6, such as a pass-through screw, for example. To provide a sealing of the parts of the end-face contact layers which are not supposed to be wrapped with the wrapping, two sealing elements 7 and 8, for example, O-rings or other sealing elements having the same function such as teflon rings, are suitably disposed. The device halves 4 and 5, respectively, are preferably formed of a material with a self-release or disengaging effect such as polytetrafluoroethylene or of a metal form or casting coated with a silicone release or disengaging agent. The two halves 4 and 5 of the device are so constructed that a serration or toothing is formed on a common pitch circle for the capacitor winding 1 such that raised parts of the fiberglass-reinforced synthetic-resin wrapping on the one side correspond to depressions on the other end face of the capacitor winding 1, as shown in FIG. 1. This ensures mutual locking and centering of the windings.

The fiberglass wrapping 3 has a wall thickness at the circumference of the capacitor winding 1 which is determined by the given number of layers, the thickness of the thread, the degree of impregnation and the winding tension, while the wall thickness at the end faces is determined by the geometry of the device halves 4 and 5. Due to the wrapping tension during the wrapping between the two device halves 4 and 5, respectively, and the end faces of the capacitor winding 1, a force is exerted not only in the radial but also in the axial direction, so that the corresponding formation of the serration or toothing is assured, optionally also by squeezing out the entrained synthetic resin from between the glass threads 3.

Following the completion of the fiberglass wrapping 3, an evacuation process may be applied in order to ensure absolute freedom from bubbles. It is also possible, however, to use a wiping slider for the impregnated fibers after the impregnation tray, almost bubble-free laminates being likewise able to be produced thereby without vacuum. These operations are optionally followed by hardening of the fiberglass-reinforced synthetic-resin composite.

In FIGS. 2 and 3, cross-sectional views of the two halves 4 and 5 of the device are shown, the respective section planes being suitably identified in FIG. 1. As may be seen from the cross-sectional view, both halves 4 and 5, respectively, of the device are formed so that raised portions of the one form set correspond to depressions in the other set. Assurance is afforded by this measure that, if several capacitor windings are built in common into one housing, a serration or toothing will be produced which makes mutual centering and locking possible.

Accordingly, the capacitor according to the invention is distinguished particularly by the feature that it has a cost-effective wrapping which ensures insulation not only at the circumference or cylindrical periphery but also at the end faces of the capacitor winding 1 as well as ensures stacking capability of the capacitor windings.

In addition, the fiberglass wrapping is distinguished by superior strength in comparison to that of heretofore employed wrappings of dummy end turns. If the volume change energy of the wrapping in a small volume element is considered (assuming an approximately uniaxial tension state), the following applies:

$$W_v \approx (\pi/2) \cdot E \cdot R \cdot \epsilon^2 \cdot b \cdot s \qquad (1)$$

where E is the modulus of elasticity (N/mm$^2$), R the winding radius (mm), $\epsilon$ the elongation (mm/mm), b the width (mm), s the thickness (mm) and $\epsilon_b$ the elongation (mm/mm) at fracture. A characteristic value for the choice of material thus exists: $K \approx E \cdot \epsilon_m^2$, which is provided for glass, polypropylene and paper in the following table:

| Material | $E \cdot \epsilon_m^2 \left[ \dfrac{N}{mm^2 \cdot 1} \right]$ |
|---|---|
| Glass | 98 |
| Polypropylene | 3.2 |
| Paper | 2.25 |

It can be seen from the foregoing table that the fiberglass wrapping according to the invention meets the strength requirements of the capacitor winding in an especially good manner.

The foregoing is a description corresponding in substance to German Application No. P 32 39 865.4, dated Oct. 27, 1982, the International priority of which is being claimed for the instant application, and which is hereby made part of this application. Any material discrepancies between the foregoing specification and the aforementioned corresponding German application are to be resolved in favor of the latter.

We claim:

1. In an electric roller-type capacitor formed with a capacitor winding built into a housing and having end-face contact layers, the improvement therein which comprises a wrapping consolidating the capacitor winding and formed of a fiberglass-reinforced synthetic resin composite, said wrapping covering the circumference of the winding as well as parts of the end-face contact layers.

2. In an electric roller-type capacitor formed with a capacitor winding built into a housing and having end-face contact layers, the improvement therein which comprises a wrapping consolidating the capacitor winding and formed of a fiberglass-reinforced synthetic resin composite, said fiberglass-reinforced synthetic resin composite being formed with a toothing in vicinity of the end faces of the capacitor winding.

3. Device for performing a method of producing an electric roller-type capacitor formed with a capacitor winding built into a housing and having end-face contact layers, comprising two form halves insertable into a tubular core of a capacitor winding and held together by a clamping device, said form halves having different shapes forming a toothing in a wrapping of fiberglass-reinforced synthetic resin composite on a common pitch circle therebetween; and a respective sealing element radially sealing said two form halves against parts of the end-face contact layers remaining free.

* * * * *